March 28, 1939.  C. KAPLAN  2,151,703
METHOD OF AND MEANS FOR CUTTING CLOTHING
Filed March 20, 1935     3 Sheets-Sheet 1

INVENTOR.
CHARLES KAPLAN
BY
   A. D. Caesar
   Charles W. Rivise
       ATTORNEYS.

March 28, 1939.　　　　　C. KAPLAN　　　　　2,151,703
METHOD OF AND MEANS FOR CUTTING CLOTHING
Filed March 20, 1935　　　3 Sheets-Sheet 2

INVENTOR.
*Charles Kaplan*
BY
*A. D. Caesar*
*Charles W. Rivise*
ATTORNEYS.

March 28, 1939.　　　　C. KAPLAN　　　　2,151,703
METHOD OF AND MEANS FOR CUTTING CLOTHING
Filed March 20, 1935　　　3 Sheets-Sheet 3
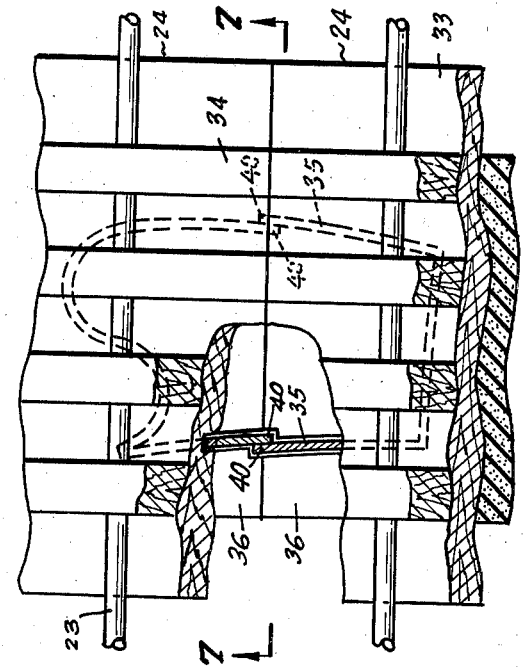
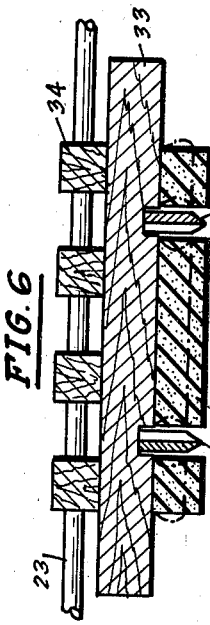
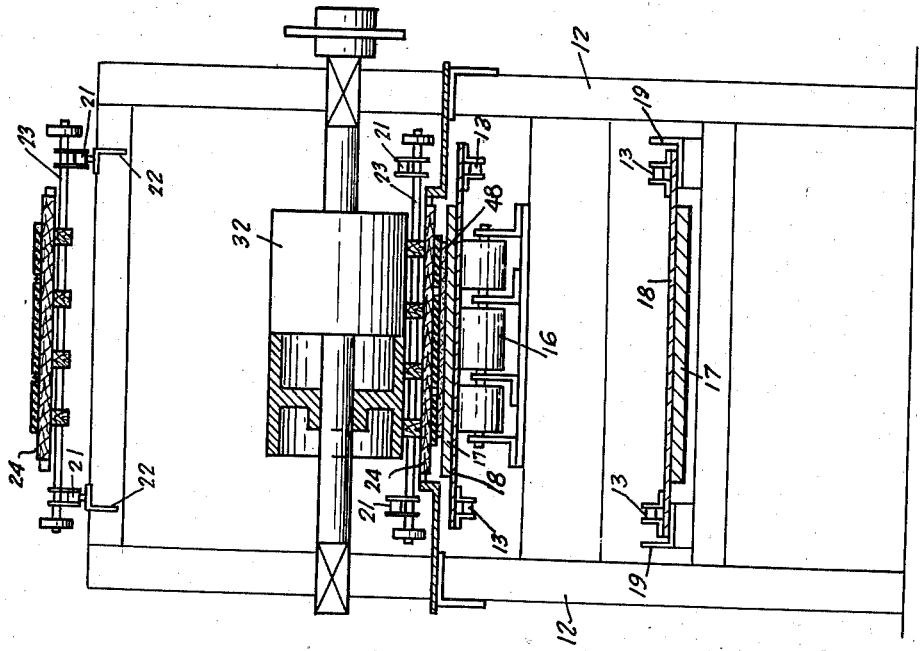
INVENTOR.
CHARLES KAPLAN
BY
ATTORNEYS.

Patented Mar. 28, 1939

2,151,703

UNITED STATES PATENT OFFICE

2,151,703

METHOD OF AND MEANS FOR CUTTING CLOTHING

Charles Kaplan, Lawrence, N. Y.

Application March 20, 1935, Serial No. 12,051

13 Claims. (Cl. 164—19)

This invention relates to methods and machines for cutting clothing and has as its object the evolution of a new method and the production of new and improved machines for cutting clothing.

It is one of the objects of my invention to devise a continuous method for cutting clothing.

It is another of the objects of my invention to provide a machine for cutting clothing.

The essence of my novel method consists in forming cutting elements into the outlines or patterns of the garment elements being cut, then continuously moving the said cutting elements at a certain predetermined rate, and feeding the cloth to be cut to the said cutting elements at the same rate of speed as the cutting elements are traveling.

The essence of a somewhat modified form of my novel method consists in feeding the cloth to the cutting elements in the manner hereinabove set forth and in successively superposing each garment element cut by any particular group or pattern of cutting elements upon the garment element previously cut by the same group of cutting elements.

My novel machine consists of a series of cutting elements formed into the outlines or patterns of the garment elements being cut and mounted for continuous movement at a certain predetermined rate of speed, means for feeding the cloth to be cut to the said cutting elements at the same rate of speed as the cutting elements are traveling, and means for causing the cutting elements to contact the cloth.

A somewhat modified form of my cutting machine has as an additional element means moving at exactly the same rate of speed as the cutting elements and so formed and positioned that it receives each successive garment element cut by any one group of knives in exactly the same position whereby the garment elements cut by any particular group or pattern of cutting knives will always be superposed upon each other.

In the preferred form my cutting elements are knives mounted upon endless belts as carriers the perimeter of the belt at the cutting surface being equal in length to a "lay" of cloth for the particular garment being cut. (In the shirt industry a "lay" is a length of material from which two dozen shirts are cut.) The cloth is fed upon a cutting bed the elements of which are also mounted on an endless belt. The means for receiving the cut cloth elements in superposed relation is also an endless belt the perimeter of which is equal to the cutting surface perimeter of the belt carrying the cutting elements.

One of the many forms which my novel cutting machine may take and one of the many machines which may execute my novel method is shown in the drawings which form a part hereof.

In the said drawings Figure 1 is a plan view of my novel cutting machine a portion of the cloth at the intake end of the machine and a portion of the cut garment receiving table have been broken away for the purpose of clearness.

Figure 5 is a section taken along the line 5—5 of Figure 2.

Figure 6 is an enlarged plan view of fragments of two adjoining cutting element carrier blocks the knives of which combine to form a single pattern. Portions of the elements have been broken away for the purpose of clearness.

Figure 7 is a section on the line 7—7 of Figure 6. The full lines show the cushioning plate in the normal position while the dot and dash lines show this plate when the pallet is under pressure.

Figure 1:
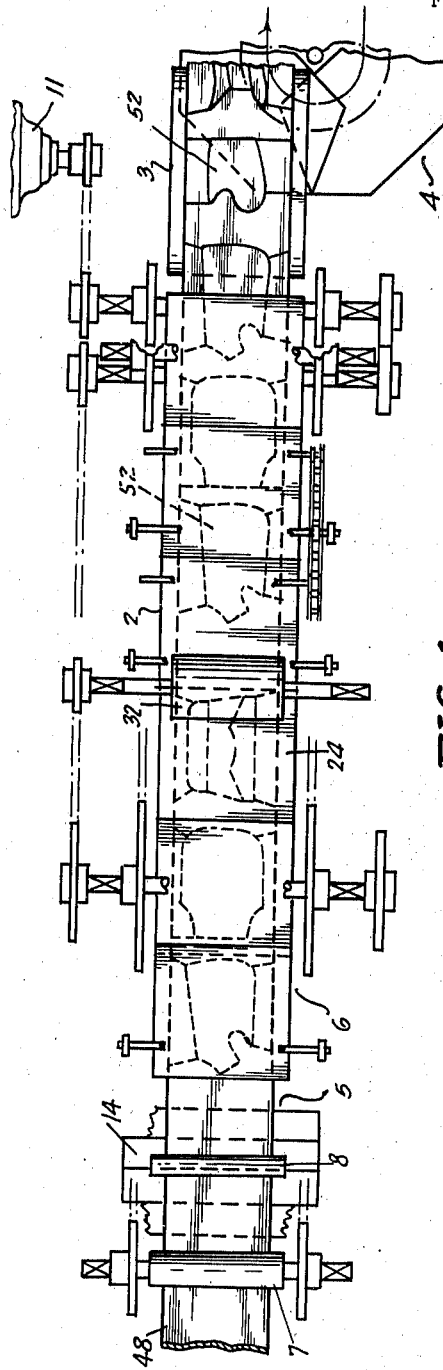
Figure 2:
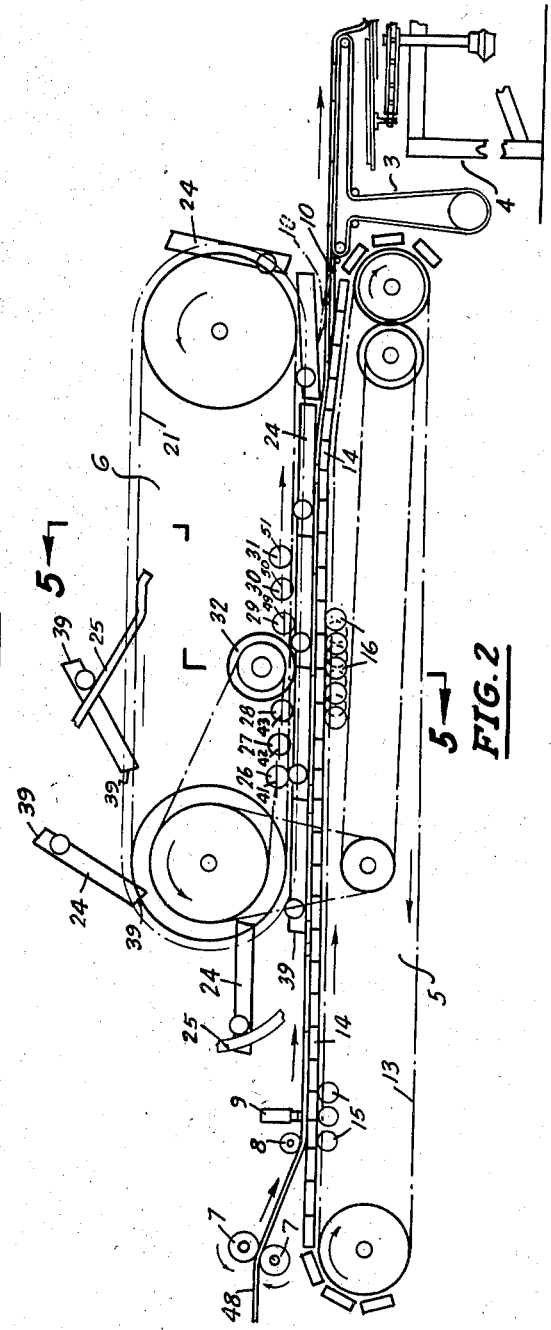
Figure 2 is a side view of the disclosure of Figure 1.
Figure 3:
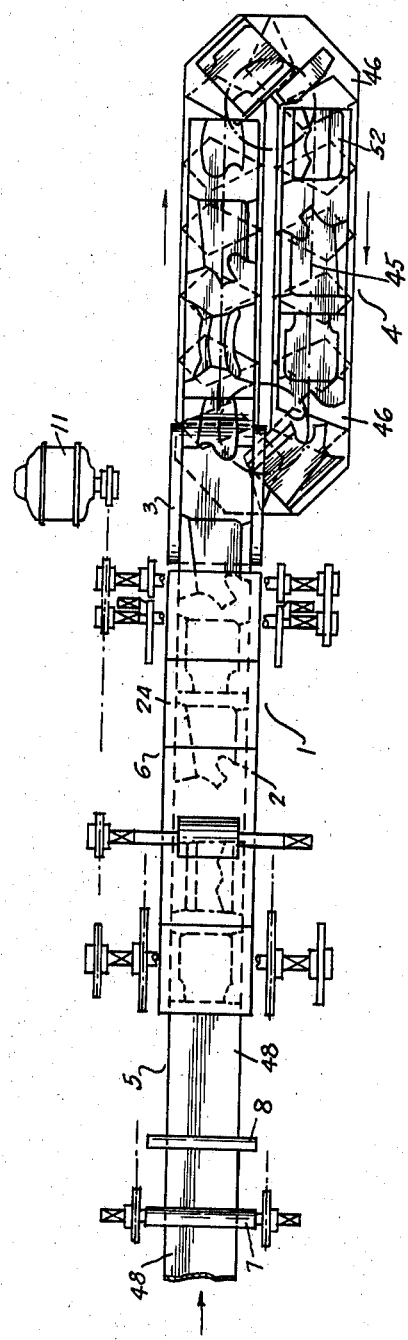
Figure 3 is a plan view of a modified cutting machine which includes means for superposing the successive garment elements cut by any group of cutting elements. The cloth at the intake end of the machine has been broken away.
Figure 4:
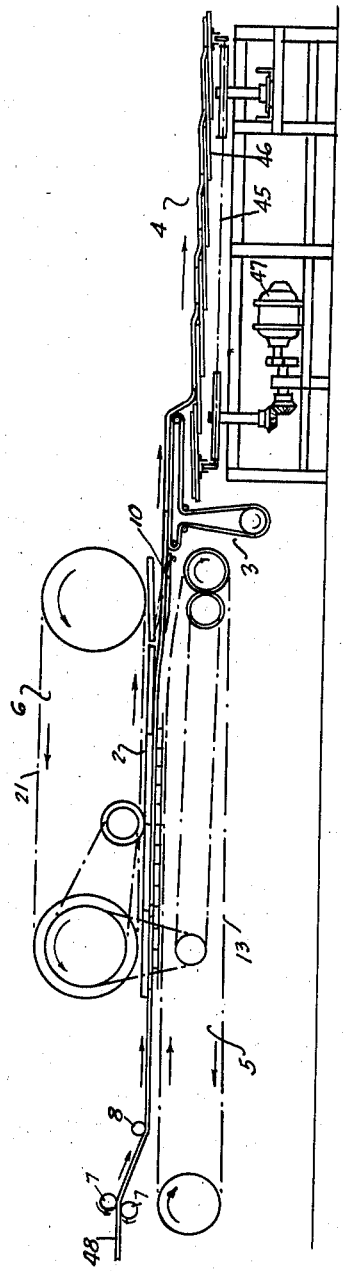
Figure 4 is a side view of the disclosure of Figure 3.

Referring more particularly to the drawings wherein similar reference numerals denote similar parts reference numeral 1 denotes my novel ensemble which consists of my novel cloth cutting machine 2, the delivery belt 3, and my novel receiving table 4.

The cutting machine 2 consists of a rotatable bed 5 in the form of an endless belt, a rotatable cutting element or knife portion 6 in the form of an endless belt, the cloth advancing rollers 7, the cloth presser roller 8, the cloth section severing element 9, the receiving plate 10, and a motor and associated gearing 11 for driving the bed 5, the cutters 6, and the cloth advancing rollers at exactly the same speed. All of the aforesaid elements are suitably mounted in or supported by the suitable frame 12.

The cutting bed 5 consists of an endless link belt 13 mounted in suitable tracks, the plurality of bed elements 14 attached to the chain 13, the pressure rollers 15, the pressure rollers 16 and the supporting tracks 19. Each bed element consists of a knife contacting element 17 of suitable material and the steel backing plate 18.

The rotatable cutting element or knife portion 6 consists of the link belt 21 mounted in suitable tracks 22, the pallet axles 23 carried by the belt 22, the pallets 24 each of which is pivotally supported on the pallet axle 23, the turnover guide tracks 25, the guide rollers 26, 27, 28, 29, 30 and 31, and the pressure roller 32.

Each pallet 24 consists of a main plate 33, the stiffening bars 34 carried by the plate, the cutting knives 35 carried by the plate, and the sponge rubber cushion and protecting element 36 attached to the plate. As is shown by the full lines in Figure 7 the lower surface 37 of the rubber cushion 36 extends beyond the edge 38 of the knives 35 when the pallets are not under pressure. When pressure is exerted upon the pallets 24 then the cushion 36 becomes compressed and assumes the position shown by the dot and dash lines in Figure 7, thereby exposing the knife edges 38. The contacting edges 39 of each pallet are inclined as shown. The cutting knives are arranged to cut the pattern desired. Where the pattern being cut by the knife elements is so large that it takes up more than one pallet, as shown in Figure 6, then the end 40 of the knife element carried by one of the pallets extends a slight distance beyond the edge of the pallet and contacts the knife element of the adjoining pallet as is clearly shown in Figure 6.

The horizontal center lines 41, 42 and 43 of the guide rollers 26, 27 and 28 respectively are successively lower and serve to gradually depress the pallets 24 before they reach the pressure roller 32. The horizontal center lines of the guide rollers 29, 30 and 31 respectively are successively higher and permit the pallets to rise gradually after they have been acted upon by the presser roller.

The receiving table 4 consists of an endless link belt member 45 mounted on suitable tracks, the plurality of overlapping plates 46, and the motor and associated driving mechanism 47. The center line perimeter of the plates 46 must be equal to the cutting surface perimeter of the pallets and the center line speed of the plates 46 must be equal to the cutting surface speed of the pallets 24. As a result of this structure the same portion of the plates 46 will always be presented to the belt 3 at the time when the belt is discharging a piece or pieces of fabric cut by a certain particular one of the pattern knives carried by the pallets 24. During the run of the machine the fabric cut by any particular pallet 24 will therefore be superposed upon the fabric previously cut by the said pallet. (It is obvious that the receiving table 4 may be driven from the motor 11 instead of by the independent motor 47.)

Although the operation of my novel machine is believed to be obvious from the foregoing description yet to avoid any possibility of a misunderstanding the following summary is here given:

Cloth 48 is fed to the bed 5 by the rollers 7 at the same rate of speed as the bed and knives 35 are traveling. When the cloth reaches the pressure roller 32 the said roller forces the pallet 24 which is then at the same point downwardly with the result that the rubber cushion becomes compressed and the exposed knife edges 38 cut into the cloth. Since the knives and cloth are moving at the same rate of speed cutting action will be bound to occur. Since the knife elements are arranged in certain specific patterns the cut fabric will be in a certain predetermined pattern. As the cut cloth portions reach the end of the bed 5 they are pushed on to the knife plate 10, thence to the belt 3 from whence they are carried and delivered to the table 4. As has been previously stated the structure and speed of the table plates 46 is such that any piece of fabric cut by any particular pallet reaches the edge of the belt 3 in time to be superposed upon the fabric previously cut by the same pallet.

(Where the lay is of such length that not all of the pallets are necessary then the section cutter 9 will function to cut a length of cloth equal to the length of cloth necessary.)

The above disclosure is to be understood as being by the way of illustration only and not by the way of limitation since many changes may be made in the disclosure here shown without departing from the spirit of my invention. For this reason it is my desire that the claims which are hereunto appended for the purpose of defining my invention should be limited only by the prior art.

Having described my invention what I claim as new and useful is:

1. A cloth cutting machine consisting of the combination of means for continuously feeding at least one layer of cloth to a cutting bed; a rotating cutting bed; rotating cutting elements, preformed into certain predetermined shapes into which it is desired to cut the said cloth, positioned for operatively contacting the said cloth for cutting the same; means for causing the said cutting elements to contact the said cloth; and continuously rotating means for receiving in superposed relation each successive cut portion of the cloth thereby grouping each portion cut by any particular cutting element with its mates cut by the same cutting element.

2. A cloth cutting machine consisting of the combination of means for continuously feeding at least one layer of cloth to a cutting bed; rotating cutting elements, preformed into certain predetermined shapes into which it is desired to cut the said cloth, positioned for operatively contacting the said cloth for cutting the same; means for causing the said cutting elements to contact the said cloth; and a rotating table having the same perimeter as the said cutting elements positioned for receiving the cut garment elements as they are being discharged from the cutting bed, whereby each garment portion cut by any particular cutting element will be superposed upon its mates cut by the same cutting element.

3. A cloth cutting machine consisting of the combination of means for continuously feeding at least one layer of cloth to a cutting bed; rotating cutting elements, preformed into certain predetermined shapes into which it is desired to cut the said cloth, positioned for operatively contacting the said cloth for cutting the same; means for causing the said cutting elements to contact the said cloth; a rotating table having the same perimeter as the said cutting elements positioned for receiving the cut garment elements as they are being discharged from the cutting bed, whereby each garment portion cut by any particular cutting element will be superposed upon its mates cut by the same cutting element; and means for actuating the said cloth feeding means, the said cutting bed, the said rotating cutting elements and the said rotating table at the same rate of speed.

4. The method of cutting cloth into elements which when joined together will form a garment, which consists in continuously feeding the cloth to be cut at a certain predetermined speed to a cutting point; utilizing cutting elements corresponding to the outlines of the garment element being cut and moving said cutting elements to said cutting point at the same rate of speed that the cloth is travelling; cutting said cloth with said shaped cutting elements as said cloth is presented to said cutting point; and successively superposing each garment element cut by any one cutting element upon the garment element previously cut by said cutting element.

5. A cloth cutting machine consisting of the combination of means for continuously feeding at least one layer of cloth to a cutting bed; a cutting bed in the form of an endless belt; an endless belt having mounted thereon cutting elements preformed into certain predetermined shapes into which it is desired to cut said cloth positioned to operatively contact said cloth; means for causing said cutting elements to contact said cloth; and means for successively superposing each garment element cut by any one element upon the garment element previously cut by said cutting element.

6. A cloth cutting machine consisting of the combination of means for continuously feeding at least one layer of cloth to a cutting bed; a cutting bed consisting of a plurality of pallets connected to form an endless belt; a cutting element consisting of an endless belt consisting of a plurality of pallets having mounted thereon cutting elements preformed into certain predetermined shapes into which it is desired to cut said cloth positioned to operatively contact said cloth; and means for causing said cutting elements to contact said cloth.

7. A cloth cutting machine consisting of the combination of means for continuously feeding at least one layer of cloth to a cutting bed; a cutting bed consisting of a plurality of pallets connected to form an endless belt; a cutting element consisting of an endless belt consisting of a plurality of pallets having cutting elements mounted thereon preformed into certain predetermined irregular shapes into which it is desired to cut said cloth positioned to operatively contact said cloth; means for causing said cutting elements to contact said cloth at a certain predetermined point; an endless belt having a perimeter equal to the perimeter of said cutting element belt positioned for receiving the cut cloth as it is discharged from said cutting bed; and means to drive said cloth, said cutting bed, said cutting element belt and said cut cloth receiving belt at the same rate of speed.

8. The method of cutting cloth into elements which when joined together form a garment, which consists in utilizing cutting elements corresponding to the outlines of the garment element to be cut; continuously feeding the cloth to be cut and said cutting elements to a point and there cutting said cloth with said shaped cutting elements as the cloth is presented to said cutting point; and successively superposing each garment element cut by any one cutting element upon the garment element previously cut by said cutting element.

9. The method of cutting cloth into elements which when joined together will form a garment, which consists in utilizing cutting elements corresponding to the outlines of the garment element to be cut; continuously feeding the cloth to be cut to a cutting point; moving said cutting elements to said cutting point independently of said cloth but at the same rate of speed as said cloth is traveling; and cutting said cloth with said shaped cutting elements as said cloth and cutting elements are presented to said cutting point.

10. The method of cutting cloth into elements which when joined together will form a garment, which consists in utilizing cutting elements corresponding to the outlines of the garment element to be cut; continuously moving the cloth which is to be cut past a cutting point at a certain predetermined rate of speed; continuously moving said cutting elements past said cutting point independently of said cloth but at the same rate of speed as said cloth is traveling; and causing said cutting elements to contact said cloth at said cutting point.

11. A cloth cutting machine consisting of the combination of a rotating cutting bed; means for continuously feeding at least one layer of cloth to said cutting bed; rotating cutting elements independent of said cutting bed and preformed into certain predetermined shapes into which it is desired to cut said cloth; means for actuating said cloth feeding means, said rotating cutting bed, and said rotating cutting elements at the same rate of speed; and means for causing said cutting elements to contact said cloth at a certain predetermined point.

12. A cloth cutting machine consisting of a cutting bed for carrying at least one layer of cloth; means for continuously moving said cutting bed past a cutting point at a certain predetermined rate of speed; rotating cutting elements independent of said cutting bed and preformed into certain predetermined shapes into which it is desired to cut said cloth; means for continuously moving said cutting elements past said cutting point at the same rate of speed as said cutting bed; and means for causing said cutting elements to contact the cloth, carried on said cutting bed, at said cutting point.

13. A cloth cutting machine consisting of the combination of a cutting bed in the form of an endless belt; means for feeding at least one layer of cloth to said cutting bed; a second endless belt having mounted thereon cutting elements preformed into certain predetermined shapes into which it is desired to cut said cloth; means for actuating said cloth feeding means, said cutting bed, and said cutting elements at the same rate of speed; and means for causing said cutting elements to contact said cloth at a certain predetermined point.

CHARLES KAPLAN.